US008799046B2

(12) United States Patent
Schneur et al.

(10) Patent No.: US 8,799,046 B2
(45) Date of Patent: Aug. 5, 2014

(54) DISPATCHING PRIORITIZED JOBS AT MULTIPLE LOCATIONS TO WORKERS

(75) Inventors: Rina R. Schneur, Lexington, MA (US);
Roger Lee Tobin, Arlington, MA (US);
Raghavendran Sivaraman, Cambridge, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1834 days.

(21) Appl. No.: 11/616,634

(22) Filed: Dec. 27, 2006

(65) Prior Publication Data

US 2008/0162242 A1 Jul. 3, 2008

(51) Int. Cl.
*G06Q 10/00* (2012.01)
*G06Q 10/06* (2012.01)
*G06Q 10/10* (2012.01)

(52) U.S. Cl.
CPC .... *G06Q 10/063118* (2013.01); *G06Q 10/0631* (2013.01); *G06Q 10/06311* (2013.01); *G06Q 10/063112* (2013.01); *G06Q 10/1097* (2013.01); *G06Q 10/06316* (2013.01)
USPC ....... 705/7.17; 705/7.12; 705/7.13; 705/7.14; 705/7.21; 705/7.26

(58) Field of Classification Search
CPC .................................................. G06Q 10/063
See application file for complete search history.

(56) References Cited

U.S. PATENT DOCUMENTS

| | | | | | |
|---|---|---|---|---|---|
| 5,111,391 | A | * | 5/1992 | Fields et al. | 705/7.14 |
| 5,467,268 | A | * | 11/1995 | Sisley et al. | 705/7.16 |
| 5,615,121 | A | * | 3/1997 | Babayev et al. | 705/7.22 |
| 5,737,728 | A | * | 4/1998 | Sisley et al. | 705/7.16 |
| 5,913,199 | A | * | 6/1999 | Dueck et al. | 705/7.26 |
| 5,913,201 | A | * | 6/1999 | Kocur | 705/7.17 |
| 5,920,846 | A | * | 7/1999 | Storch et al. | 705/7.14 |
| 5,943,652 | A | * | 8/1999 | Sisley et al. | 705/7.25 |
| 5,953,389 | A | * | 9/1999 | Pruett et al. | 379/9 |
| 5,963,911 | A | * | 10/1999 | Walker et al. | 705/7.12 |
| 6,078,912 | A | * | 6/2000 | Buerger et al. | 700/99 |
| 6,578,005 | B1 | * | 6/2003 | Lesaint et al. | 705/7.14 |
| 6,633,900 | B1 | * | 10/2003 | Khalessi et al. | 709/202 |
| 6,941,514 | B2 | * | 9/2005 | Bradford | 715/700 |
| 6,983,188 | B2 | * | 1/2006 | Loughran et al. | 700/99 |
| 6,990,458 | B2 | * | 1/2006 | Harrison et al. | 705/7.14 |
| 7,003,475 | B1 | * | 2/2006 | Friedland et al. | 705/7.13 |
| 7,092,894 | B1 | * | 8/2006 | Crone | 705/7.26 |
| 7,127,412 | B2 | * | 10/2006 | Powell et al. | 705/7.16 |
| 7,222,082 | B1 | * | 5/2007 | Adhikari et al. | 705/7.22 |
| 7,228,207 | B2 | * | 6/2007 | Clarke et al. | 701/3 |
| 7,251,612 | B1 | * | 7/2007 | Parker et al. | 705/7.22 |
| 7,283,971 | B1 | * | 10/2007 | Levine et al. | 705/7.13 |
| 7,313,530 | B2 | * | 12/2007 | Smith et al. | 705/7.24 |
| 7,337,191 | B2 | * | 2/2008 | Haeberle et al. | 1/1 |
| 7,346,531 | B2 | * | 3/2008 | Jacobs | 705/7.15 |
| 7,433,830 | B2 | * | 10/2008 | Ingman et al. | 705/7.13 |

(Continued)

*Primary Examiner* — Brett Feeney

(57) ABSTRACT

A system, method and computer program product are provided for assigning prioritized jobs at multiple locations to workers with the objective of maximizing the number of higher priority jobs assigned, with secondary objectives of minimizing worker travel time between locations and of balancing workload across workers. In doing so, the system, method and computer program product consider job data including job location, skills required, time required and additional job constraints, as well as resource data including worker location, worker skills, worker time constraints and additional worker constraints. The system, method and computer program product also consider travel time between various pairs of job locations and worker locations in order to optimize work assignments while minimizing travel time.

24 Claims, 6 Drawing Sheets

(56) References Cited

U.S. PATENT DOCUMENTS

| | | | |
|---|---|---|---|
| 7,440,906 B1* | 10/2008 | Wetzer et al. ................. 705/7.12 |
| 7,451,449 B2* | 11/2008 | Thompson et al. ........... 718/104 |
| 7,457,762 B2* | 11/2008 | Wetzer et al. ................. 705/7.25 |
| 7,467,161 B2* | 12/2008 | Frisina ................................ 1/1 |
| 7,487,106 B2* | 2/2009 | Levine et al. ................. 705/7.14 |
| 7,555,440 B2* | 6/2009 | Ingman ......................... 705/7.16 |
| 7,561,985 B2* | 7/2009 | Kanai ............................ 702/182 |
| 7,603,285 B2* | 10/2009 | Jacobs et al. ................. 705/7.14 |
| 8,365,173 B2* | 1/2013 | Lin et al. ....................... 718/102 |
| 8,428,990 B2* | 4/2013 | Moll et al. .................... 705/7.12 |
| 8,433,598 B2* | 4/2013 | Ingman et al. ............... 705/7.14 |
| 2001/0037229 A1* | 11/2001 | Jacobs et al. ...................... 705/8 |
| 2001/0049619 A1* | 12/2001 | Powell et al. ...................... 705/9 |
| 2002/0010615 A1* | 1/2002 | Jacobs ............................... 705/9 |
| 2002/0065700 A1* | 5/2002 | Powell et al. ...................... 705/9 |
| 2004/0102983 A1* | 5/2004 | Carlson et al. .................... 705/1 |
| 2004/0111311 A1* | 6/2004 | Ingman et al. ..................... 705/9 |
| 2004/0111312 A1* | 6/2004 | Ingman et al. ..................... 705/9 |
| 2004/0162811 A1* | 8/2004 | Wetzer et al. ..................... 707/2 |
| 2004/0210621 A1* | 10/2004 | Antonellis ...................... 709/200 |
| 2005/0119930 A1* | 6/2005 | Simon ............................... 705/9 |
| 2005/0216182 A1* | 9/2005 | Hussain et al. ................. 701/200 |
| 2006/0111089 A1* | 5/2006 | Winter et al. ............... 455/414.1 |
| 2006/0111955 A1* | 5/2006 | Winter et al. ..................... 705/8 |
| 2006/0265294 A1* | 11/2006 | de Sylva ......................... 705/28 |
| 2007/0005522 A1* | 1/2007 | Wren .............................. 706/13 |
| 2007/0015518 A1* | 1/2007 | Winter et al. ............... 455/456.1 |
| 2007/0038498 A1* | 2/2007 | Powell et al. ...................... 705/8 |
| 2007/0039001 A1* | 2/2007 | Briccarello et al. ........... 718/102 |
| 2007/0167168 A1* | 7/2007 | Fukamachi et al. ........ 455/456.1 |
| 2007/0208604 A1* | 9/2007 | Purohit et al. ..................... 705/9 |
| 2007/0282618 A1* | 12/2007 | Barahona et al. ................. 705/1 |

\* cited by examiner

DISPATCHING PRIORITIZED JOBS AT MULTIPLE LOCATIONS TO WORKERS

BACKGROUND

In the past, some dispatching systems have used heuristic or ad-hoc methods to accomplish the assignment of workers to jobs. The quality of results of these systems has varied depending on the order in which the jobs are presented to the system or on the order in which the workers are presented. As such, at least some of these systems may provide inefficient assignments.

While these systems are capable of generating work assignments, it would be desirable to utilize systems and methods that more fully and more strategically take into consideration various job and worker constraints in order to optimize work assignments. For example, it would be advantageous to consider the priorities of various jobs, the travel times between job locations and worker locations, and the skill sets of workers in order to dispatch work assignments more efficiently.

BRIEF DESCRIPTION OF THE SEVERAL VIEWS OF THE DRAWING(S)

DETAILED DESCRIPTION OF PREFERRED EMBODIMENTS

Figure 1A:
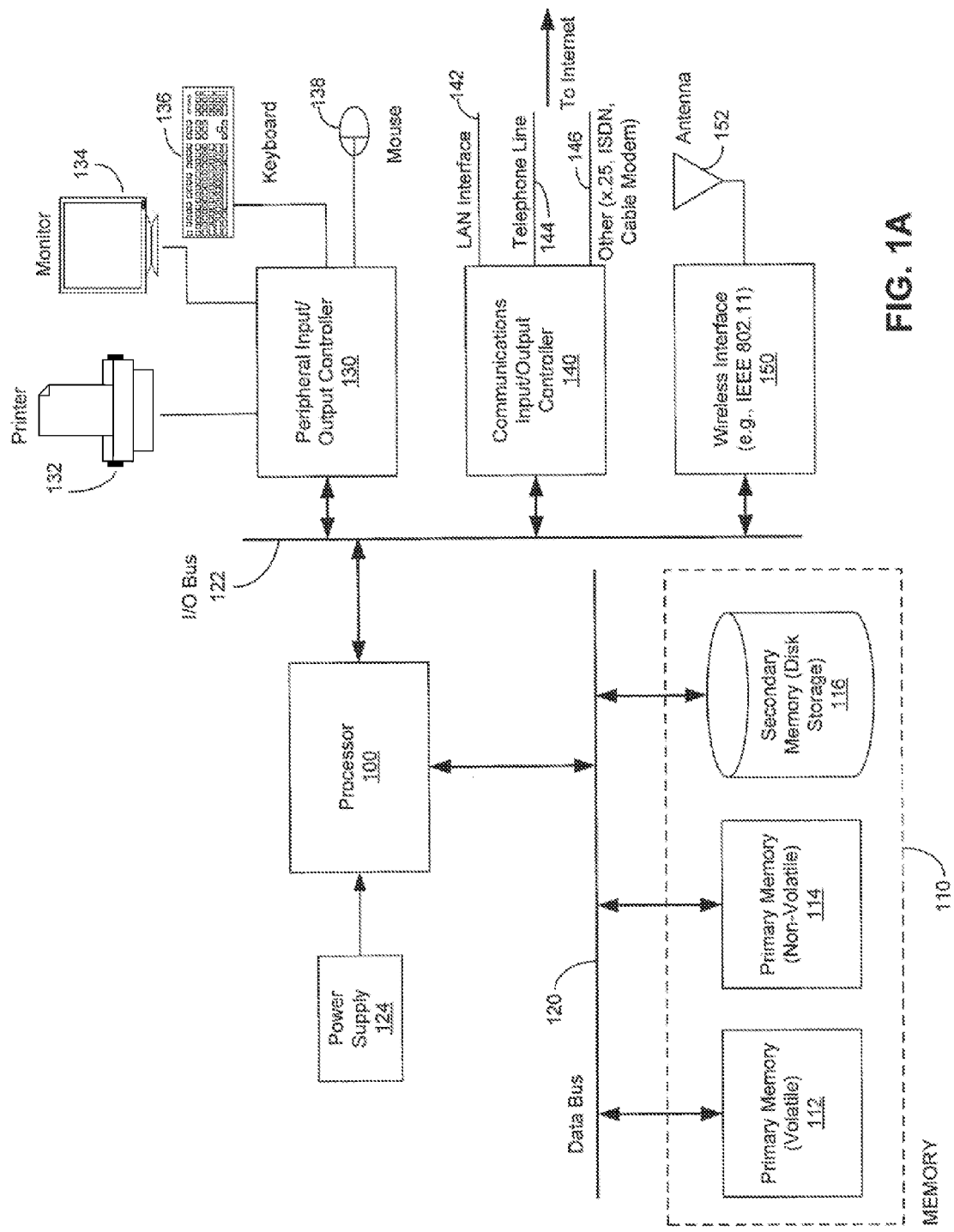
FIG. 1A is an illustration of an exemplary embodiment of a computing device.

Exemplary embodiments will now be described hereinafter with reference to the accompanying drawings, in which exemplary embodiments and examples are shown. Like numbers refer to like elements throughout.

As will be appreciated, exemplary embodiments may be implemented as a method, a data processing system, or a computer program product. Accordingly, exemplary embodiments may take the form of an entirely hardware embodiment, an entirely software embodiment, or an embodiment combining software and hardware aspects. Furthermore, exemplary embodiments may take the form of a computer program product on a computer-readable storage medium having computer-readable program instructions (e.g., computer software) embodied in the storage medium. More particularly, exemplary embodiments may take the form of web-implemented computer software. Any suitable computer-readable storage medium may be utilized including hard disks, CD-ROMs, optical storage devices, or magnetic storage devices.

Exemplary embodiments are described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In the exemplary embodiments referenced herein, a "computer" or "computing device" may be referenced. Such computer may be, for example, a mainframe, desktop, notebook or laptop, a hand held device such as a data acquisition and storage device, or it may be a processing device embodied within another apparatus such as, for example, a set top box for a television system or a wireless telephone. In some instances the computer may be a terminal used to access data or processors over a network. Turning to FIG. 1A, one embodiment of a computing device is illustrated that can be used to practice aspects of the various exemplary embodiments. In FIG. 1A, a processor 100, such as a microprocessor, is used to execute software instructions for carrying out the defined steps. The processor receives power from a power supply 124 that also provides power to the other components as necessary. The processor 100 communicates using a data bus 120 that is typically, but not necessarily, 16 or 32 bits wide (e.g., in parallel). The data bus 120 is used to convey data and program instructions, typically, between the processor and memory. In the present embodiment, memory can be considered primary memory 112 that is RAM or other forms which retain the contents only during operation, or it may be non-volatile 114, such as ROM, EPROM, EEPROM, FLASH, or other types of memory that retain the memory contents at all times. The memory could also be secondary memory 116, such as disk storage, that stores large amount of data. In some embodiments, the disk storage may communicate with the processor using an I/O bus 122 instead or a dedicated bus (not shown). The secondary memory may be a floppy disk, hard disk, compact disk, DVD, or any other type of mass storage type known to those skilled in the computer arts.

The processor 100 also communicates with various peripherals or external devices using an I/O bus 122. A peripheral I/O controller 130 is used to provide standard interfaces, such as RS-232, RS-422, DIN, USB, or other interfaces as appropriate to interface various input/output devices. Typical input/output devices include local printers 132, a monitor 134, a keyboard 136, and a mouse 138 or other typical pointing devices (e.g., rollerball, trackpad, joystick, etc.).

The processor 100 typically, but not necessarily, also communicates using a communications I/O controller 140 with external communication networks, and may use a variety of interfaces such as data communication oriented protocols 146 such as X.25, ISDN, DSL, cable modems, etc. The communications controller 140 may also incorporate a modem (not shown) for interfacing and communicating with a standard telephone line 144. The communications I/O controller may incorporate an Ethernet interface 142 for communicating over a LAN. Any of these interfaces may be used to access a wide area network such as the Internet, intranets, LANs, or other data communication facilities.

The processor 100 may communicate with a wireless interface 150 that is operatively connected to an antenna 152 for communicating wirelessly with another device, using for example, one of the IEEE 802.11 protocols, 802.15.4 protocol, or standard 3G wireless telecommunications protocols, such as CDMA2000 1x EV-DO, GPRS, W-CDMA, or other protocol.

Figure 1B:
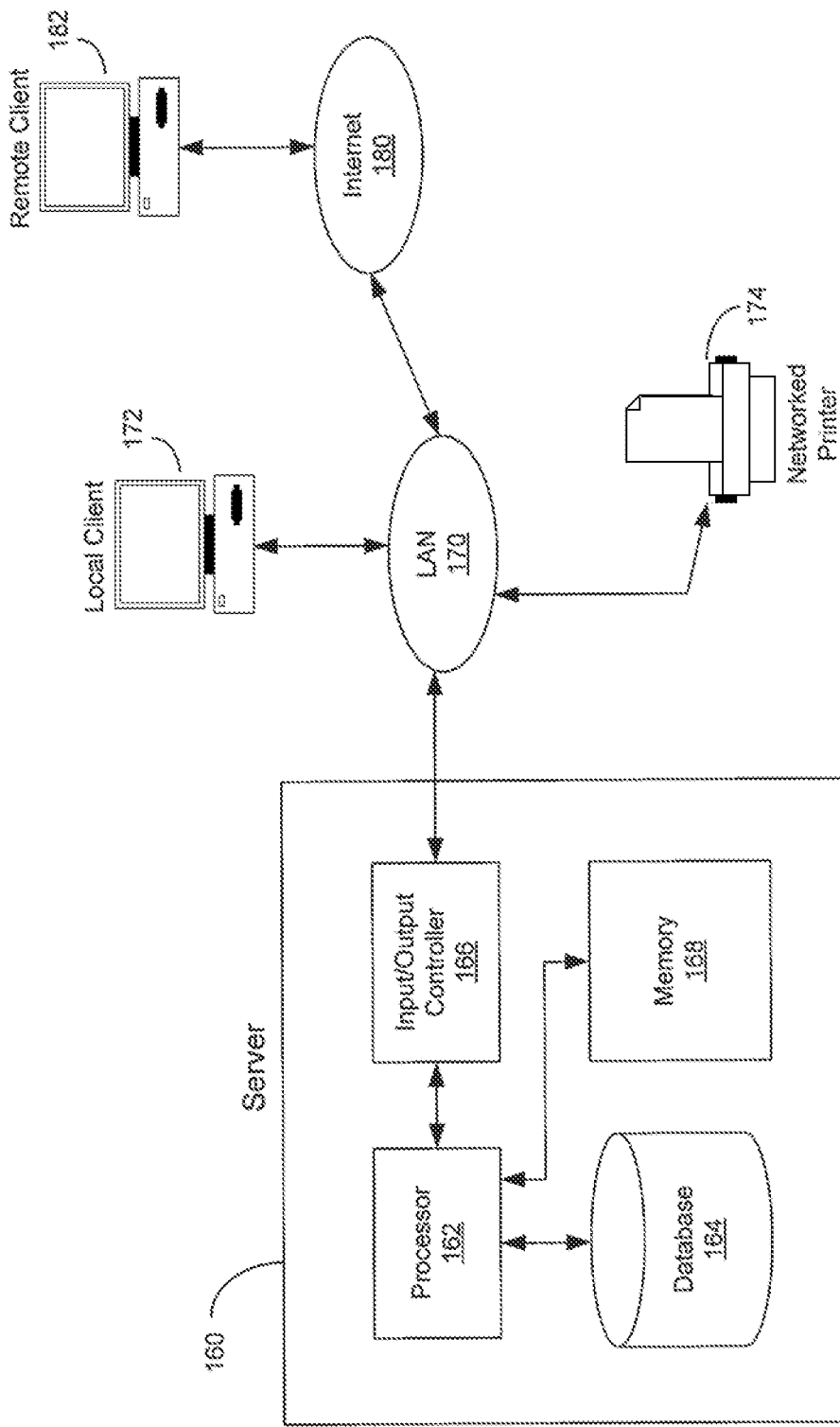
FIG. 1B is an exemplary embodiment of a processing system having a distributed communication and processing architecture.

An alternative embodiment of a processing system that may be used is shown in FIG. 1B. In this embodiment, a distributed communication and processing architecture is shown involving a server 160 communicating with either a local client computer 172 or a remote client computer 182. The server 160 typically comprises a processor 162 that communicates with a database 164, which can be viewed as a form of secondary memory, as well as primary memory 168. The processor also communicates with external devices using an I/O controller 166 that typically, but not always, interfaces with a LAN 170. The LAN may provide local connectivity to a networked printer 174 and the local client computer 172. These may be located in the same facility as the server, though not necessarily in the same room. Communication with remote devices typically is accomplished by routing data from the LAN 170 over a communications facility to a wide area network 180, such as the Internet. A remote client computer 182 may execute a web browser so that the remote client 182 may interact with the server 160 as required by transmitted data through the wide area network 180, over the LAN 170, and to the server 160.

Those skilled in the art of data networking will realize that many other alternatives and architectures are possible and can be used to practice the preferred embodiments. The embodiments illustrated in FIGS. 1A and 1B can be modified in different ways and be within the scope of the exemplary embodiments as claimed.

According to exemplary embodiments, a system, method and computer program product are provided for assigning prioritized jobs at multiple locations to workers with the objectives of maximizing the number of higher priority jobs assigned, minimizing worker travel time between locations and balancing the workload across the workers, at least for workers of the same or comparable skill level. Jobs or tasks are assigned such that assigning one job of a given priority is more important than assigning any number of lower priority jobs. According to various exemplary embodiments, the method is specifically designed for cases in which there are a large number of priority classes, though it is equally operable with only a few priority classes. The jobs that are to be performed have specific locations at which the work is to be done and generally require certain skills to perform the jobs. Likewise, the workers available to perform these jobs have certain skill sets and may have constraints on the locations at which they are able to work. In optimizing work assignments, exemplary embodiments utilize this job and worker information by comparing the skills required of the job with the skill sets of workers, and comparing the job location with the location constraints of the workers. The jobs are generally assigned to workers during their available work hours, but overtime work may be accommodated. Exemplary embodiments allow for additional constraints such as limitations on the minimum or maximum number of workers that can be at a particular location at any time, and "time window" constraints that restrict the time of day a particular job can be performed. The system may serve as a dispatch module and can accept input from and supply work assignments to existing work management systems and other legacy systems and may replace dispatching modules in such systems.

According to exemplary embodiments, the method, system and computer program product use a sequence of mathematical optimizations to implicitly consider all possible combinations of assignments to find a best fit, such as in accordance with a lexicographic optimization or lexicographic maximization process. Moreover, one embodiment distributes the workload between workers as evenly as possible given their skills and the skill sets required by the jobs and also minimizes total travel time. For example, starting with jobs that are of the highest priority, a first optimization determines the maximum number of jobs of that priority level that can be assigned, based on job constraints and worker constraints. A second optimization determines the maximum number of jobs of a second highest priority that can be assigned, given that the maximum number of highest priority jobs determined in the first optimization must be maintained. It is to be appreciated that these optimizations do not determine which jobs or which workers will be assigned; rather, these optimizations only determine the number of jobs at each priority level that can be assigned to workers. In other words, the set of highest priority jobs found in a second optimization may be a different set than that found in the first optimization, but the overall number of highest priority jobs remains the same. Ensuing optimizations may be performed for each additional priority level that can be assigned given the number of available workers. For instance, a third optimization can be performed to maximize the number of third highest priority jobs, given that the maximum number of second highest and first highest priority jobs must be maintained (although again the actual jobs having the first and second priorities that are assigned may differ following the third optimization as compared to those assigned by the first and second optimizations). After these initial optimizations are performed, potential job assignments are considered but no specific job assignments have been fixed; only the number of jobs that can be assigned at each priority level has been determined. Thus, each ensuing optimization may change the potential job assignments in a way to maintain the objectives of previous optimizations and to find the best solution to the current optimization. In this manner, the results of a first optimization provide a suitable initial solution for the next optimization and so on, the result being that overall computation time is minimized. This optimization process typically continues until all priority classes have been considered or until there are no more jobs to be assigned.

After the maximum number of assignable jobs for each priority class has been determined, a final mathematical optimization is performed to assign jobs to available workers.

This final optimization considers all jobs and all workers, with the constraint that the previously determined maximum number of jobs for each priority class must be assigned. According to various exemplary embodiments, one objective of this optimization is to minimize travel time. Another objective of this optimization is to balance workload across a group of workers of the same or comparable skill level. The final optimization may also take into account the relative priority or importance of the additional objectives. For example, if the minimization of travel time is designated to be of more importance than the balancing of the workload across a group of workers, the final optimization can initially optimize the assignment of jobs of each priority class so as to minimize travel time without consideration for balancing the workload across a group of workers. The final optimization of this exemplary embodiment can thereafter maximize the balance of the workload across the group of workers while maintaining the minimization of the travel time that has been determined in the prior step. While many benefits flow from such an optimization process, one indirect benefit is the reduction or minimization of overtime since travel time is minimized and workload is balanced across a group of workers.

As described in further detail below, an exemplary embodiment of the system is configured to receive data on the available jobs including location, time required, skills required and priority class; data on available workers including the workers' available hours, skills, and the locations at which the workers are available to work; data regarding the travel time between each pair of locations (e.g., worker locations and job locations) as well as the travel time between various job locations; and any additional job, worker or travel time constraints, such as the maximum number of locations that a worker can visit in one day or within some other predefined period of time.

Exemplary methods include a multi-variate optimization routine that is executed for one or more job sets that have been assigned a priority class. While considering a number of constraints, the multi-variate optimization routine determines x jobs having n priority to be scheduled for that day, y jobs having n+1 priority to be scheduled for that day, z jobs of n+2 priority to be scheduled for that day, etc., where x, y, z, and n are integer numerals and jobs having n priority are at a higher priority level than jobs having n+1, n+2, etc. priority. Constraints may include, for example, the number of available workers, the location of workers, travel time between locations, skill sets of workers, the need to distribute work equitably among workers, the amount of work (i.e., number of jobs of any priority), the job type priority, the types of jobs and skill sets needed, the average time required to complete jobs of various types, worker absences, the maximum number of locations that a worker can visit in one day and available productive hours by day.

By way of example, but not of limitation, an optimization model that may be employed to maximize the number of jobs of priority k that that can be assigned will be described. If priority k does not represent the highest priority class, this optimization model for maximizing the number of jobs of priority k that can be assigned would be solved after the number of jobs that can be assigned to each priority class higher than k has been maximized. In this regard, the exemplary optimization model may be expressed as:

$$\text{Minimize} \sum_{t \text{ in techs}} \sum_{j \text{ in jobs}[k]} x_{tj}$$

in which techs is the set of available technicians t, jobs[k] is the set of jobs j of priority k, and $x_{tj}$ is a decision variable that takes the value of 1 if the job j is assigned to technician t, but is 0 otherwise. This exemplary optimization model is subject to the following constraints:

1. If job j cannot be done by technician t (either because of skill mismatch or if she cannot travel to the job's location), $x_{tj}=0$ 2. Each job j can be done by at most one technician $$\sum_{t \text{ in techs}} x_{tj} \leq 1$$

3. A technician can do job j only if she visits the location l of the job $x_{tj} \leq v_{tl}$ wherein $v_{tl}$ is a decision variable that takes the value 1 if technician t visits location l, but is 0 otherwise 4. A technician t visits a location l only if she travels to that location $$\sum_{m \text{ in locations}} r_{tlm} = v_{tl}$$

$$\sum_{m \text{ in locations}} r_{tml} = v_{tl}$$

wherein locations is the set of all locations, e.g., central offices, $r_{tlm}$ is a decision variable that describes the route that a technician t takes and that takes the value 1 if the technician travels from origin location l to destination location m, but is 0 otherwise 5. A technician t visits the location b she starts out of $v_{tb}=1$ 6. For every priority class i higher that k, n[i] number of jobs must be assigned $$\sum_{j \text{ in jobs}[i]} \sum_{t \text{ in techs}} x_{tj} = n[i]$$

wherein n[i] is the number of jobs of priority I that must be assigned

7. A technician t's total time for travel and jobs must be less than her available time $$\sum_{j \text{ in jobs}} d_j \cdot x_{tj} + \sum_{l,m \text{ in locations}} t_{ml} \cdot r_{tml} \leq w_t$$

wherein $d_j$ is the duration of job j, $t_{ml}$ is the travel time between locations m and l (in minutes, for example), and $w_t$ is technician t's available time to work (in minutes, for example).

Although not depicted in conjunction with the above described exemplary optimization model, the model may also include decision variable(s) that keeps track of when a job is completed. As such, the model may also be subject to constraints that ensure that one or more predefined jobs are completed within a predefined period or window of time.

Figure 2:
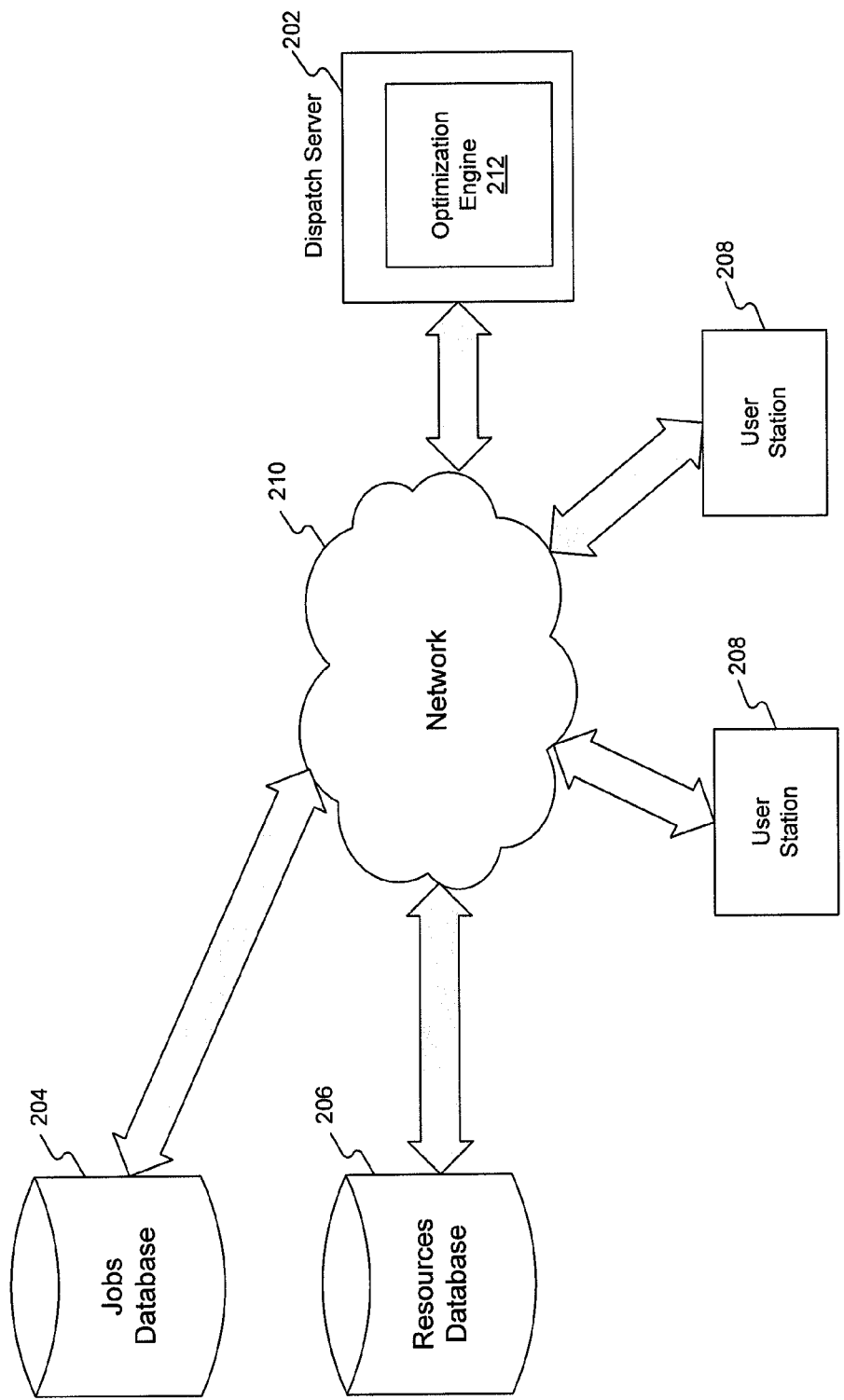
FIG. 2 is an illustration of one embodiment of an exemplary system for dispatching jobs.
Figure 4:
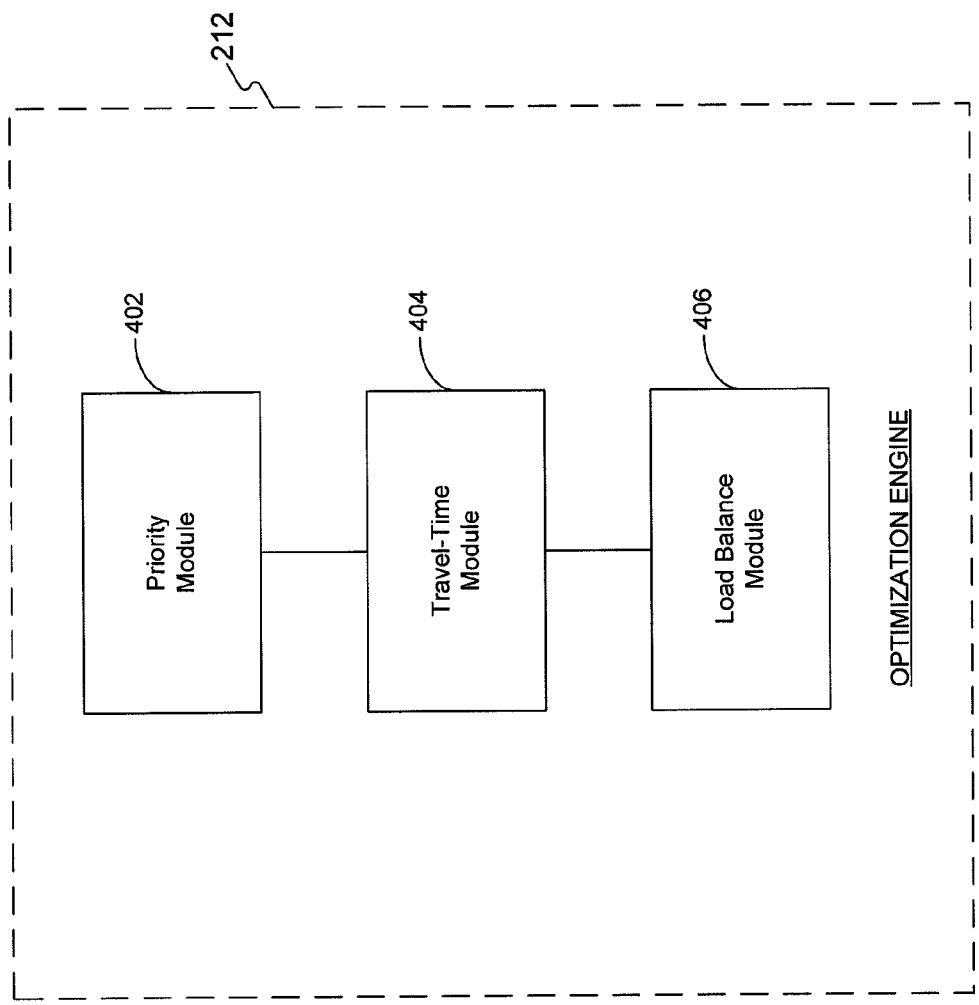
FIG. 4 is an illustration of an exemplary optimization engine according to one embodiment.

FIG. 2 illustrates an exemplary system that may be used for implementing one or more exemplary embodiments, such as to perform the optimization described above. The system of FIG. 2 is comprised of a dispatch server 202 that is communicatively connected with at least a jobs database 204, a resource database 206, and one or more user stations 208 through a network 210. The dispatch server 202 is comprised of at least an optimization engine 212. In some embodiments, the optimization engine 212 is further comprised of at least a travel-time module 404, as illustrated in FIG. 4. The optimization engine 212 in various embodiments is also comprised of a priority module 402 and a load balance module 406. The optimization engine 212, including the priority module 402 and the load balance module 406, is typically comprised of software stored in a memory device and executed by a processor to perform multi-variate calculations involving jobs, the assigned priority of jobs, the location of the jobs, travel time, and resources which include workers, the locations of workers and the skill sets possessed by particular workers. These multi-variate calculations result in an optimized workplan or schedule that is accessible at the user stations 208 and may be used to dispatch workers. In various exemplary embodiments, the travel-time module 404 is generally comprised of software, a data table or a combination of both that is stored in a memory device and executed by a processor. The travel-time module 404 is used to calculate the average travel time between a job location and the locations of one or more workers that may be assigned to a respective job. In one embodiment, the travel time module 404 may contain or have access to tables of travel times between locations that are repetitively visited to avoid the latency involved with the calculation of travel time. The jobs database 204 and the resource database 206 are comprised of data stored on a memory device and may in some instances advantageously make use of commercial database software such as Access™ as available from Microsoft Corporation or other database software packages. While the jobs database 204 and the resource database 206 are shown in FIG. 2 as two separate databases, it is to be appreciated that these databases may be a single database, may be a part of other computerized systems such as, for example, human resources systems, inventory systems, etc., and may reside on one or more physical memory devices.

The network 210 may be for instance the Internet, or it may be any other form of private or public networks that provides for the transfer of data between the dispatch server 202 and the user stations 208. It may be comprised of one or more of wired, optical and wireless components. The user stations 208 are generally computing devices, such as described in relation to FIGS. 1A and 1B, above, and may be connected wired, optically or wirelessly to the network 210.

Figure 3:
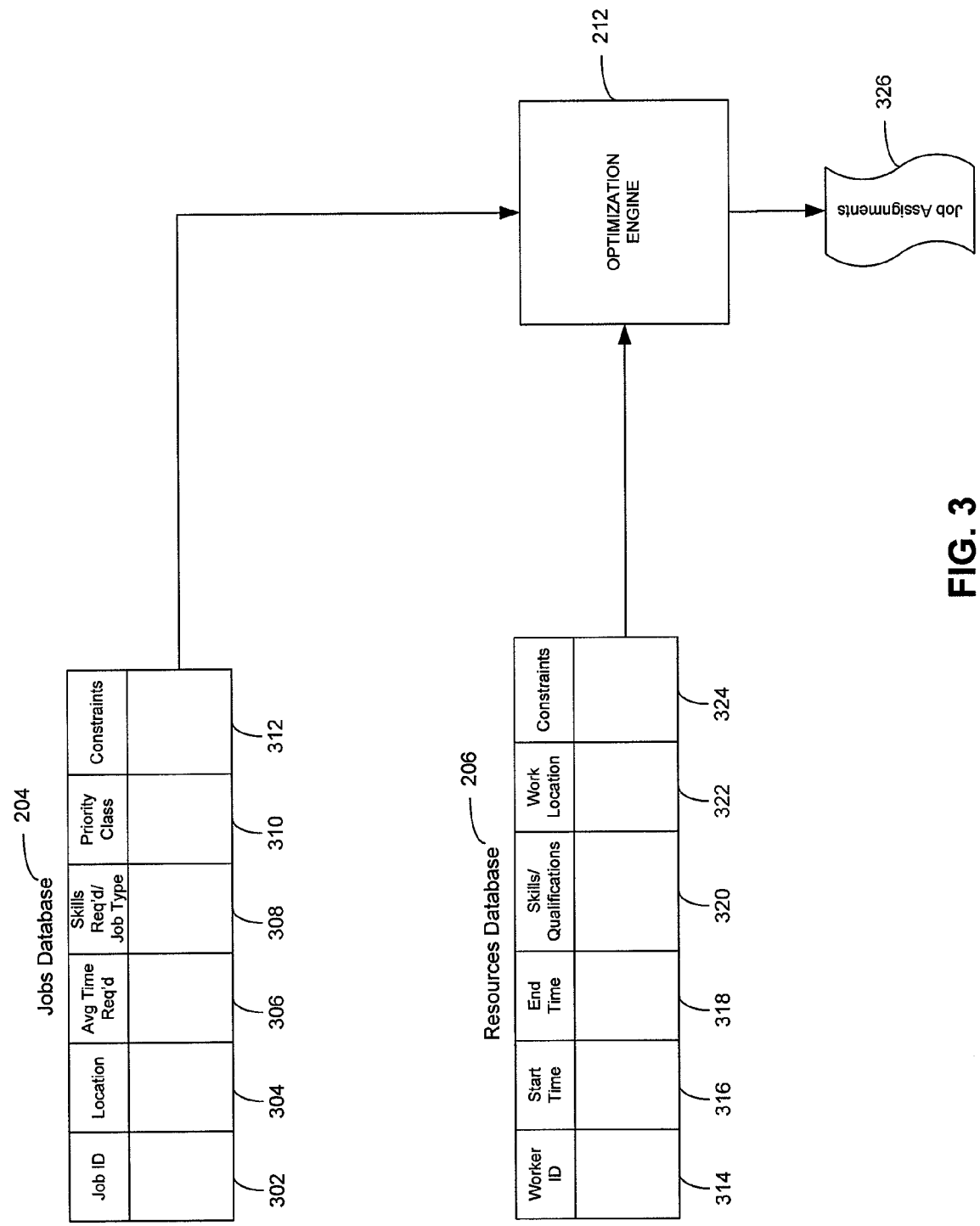
FIG. 3 is an exemplary job dispatching system showing various elements that comprise such a system.

FIG. 3 is a schematic representation of the exemplary system shown in FIG. 2. In FIG. 3, the jobs database 204 is comprised of an inventory of available jobs or tasks. According to exemplary embodiments, data fields in the jobs database 204 include a job identifier (job ID) 302, a location 304 where the job is to be performed, and average time required 306 to complete the job, which may be determined from the skills required/job type 308 information, a priority class 310 that is assigned to the job and any constraints 312 that may be associated with the job. Priority class 310 may be assigned based on the job's effect on the business entity. For instance, if the business entity is a utility and the job would restore or enhance service to a large number of customers, the job would be assigned a high priority. Job-related constraints 312 may include, for example, the maximum or minimum number of workers that may be assigned to a job, "time window" constraints on when particular jobs can be done, etc.

The resources database 206 is comprised of information about available workers. According to exemplary embodiments, this information includes a worker identification (worker ID) 314, which may be, for example, a worker's name, employee number, etc.; the start time 316 and ending time 318 of a worker's normal work shift, which may include information about the worker's normal work schedule (e.g., night shift, Monday-Friday, Monday-Thursday, etc.); skill sets 320 possessed by a respective worker; the worker's normal work location 322; and any constraints 324 on the worker. Worker constraints 324 may include, for example, a worker's ability to travel or to work overtime, schedule limitations, etc.

Information from both the jobs database 204 and the resource database 206 is accessed by the optimization engine 212. The optimization engine 212 is configured to create a work schedule with as many jobs assigned as possible, with higher priority jobs more heavily weighted than those of lower priority jobs. According to various exemplary embodiments, the optimization engine 212 is further configured to create this work schedule while minimizing total travel time of workers to their assigned job locations, and to balance the workload equitably across a group of workers. According to various exemplary embodiments, the optimization engine 212 is comprised of one or more modules executing on the processor of one or more computing devices (e.g., the dispatch server 202 of FIG. 2). For example, the optimization engine 212 as illustrated in FIG. 4 is comprised of a priority module 402, a travel-time module 404, and a load balance module 406. The priority module 402 first considers the priority class 310 of the available jobs, and for jobs having the highest priority the priority module 402 considers the average time required 306 to perform the jobs, the location of the jobs 304, the skills required 308 to perform the jobs, the available workers, their skill sets 320 and the location of the workers 322 to determine the number of jobs having the highest priority that may be assigned. Job constraints 312 and worker constraints 324 are also considered. If travel is required between a worker's location 322 and a job location 304, or between subsequent job locations 304, then travel time is computed or looked up in a table via the travel-time module 404. Load balancing is then performed by the load balance module 406. Workers may be grouped into sets in the resources database 206, such that each set contains a group of workers who have similar skills. The sets may also define a group of workers with the same travel constraints (e.g., workers who can visit the same locations). Thus, each set defines a group of workers who can exchange job assignments amongst themselves. In some embodiments, once an initial solution for job assignments is determined by the priority module 402 and travel-time module 404, the load balance module 406 receives this initial solution and can reshuffle the work assignments to ensure that each worker in a set of workers has approximately the same amount of work as other workers within that set or to at least minimize the difference in the amount of work assigned to the workers within the set. In some embodiments, the amount of work is measured in increments of time (e.g., minutes or hours). The load balance module 406 can also reshuffle the work assignments to ensure that each worker has approximately the same amount of travel time or to at least minimize the difference in travel time experienced by the workers within the set.

According to various exemplary embodiments, the optimization engine 212 is configured to simultaneously or sequentially minimize travel time and balance workload across workers, when optimizing work assignments. In various other embodiments, the optimization engine 212 can optimize work assignments while only minimizing travel time or only balancing the workload.

This process is iteratively repeated by the optimization engine 212 for each level of priority class 310 of jobs until a workplan is developed for the resources available for the time period under consideration (e.g., day, week, month, etc.). The work schedule is then distributed to the user stations 208 or otherwise assigned to the workers as job assignments 326.

Figure 5:
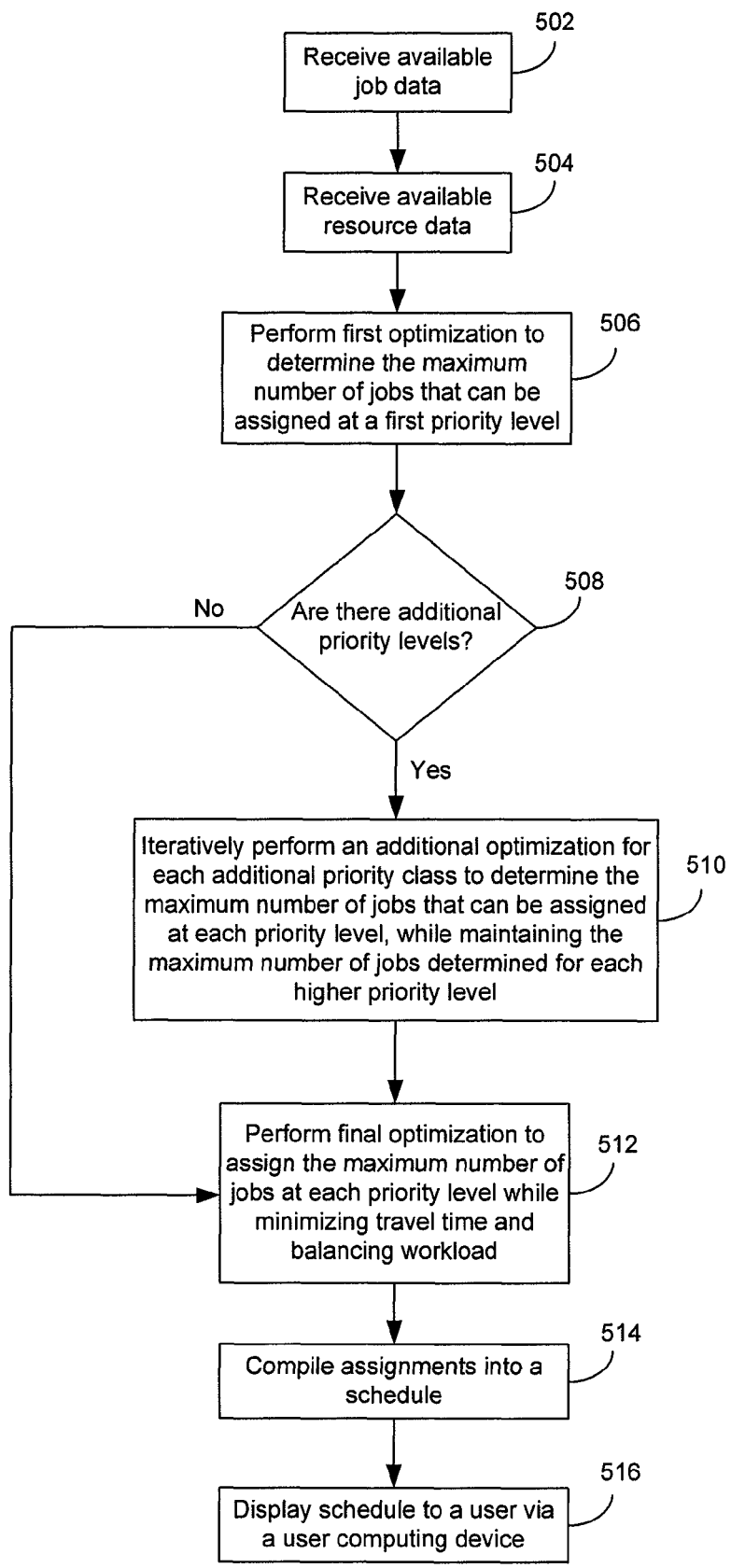
FIG. 5 is an exemplary flowchart for executing a job dispatching process.

FIG. 5 is an exemplary flowchart of an exemplary embodiment for a method of optimizing a work schedule for dispatching to workers to multiple locations. As described in detail above, the process may begin at 502 with receiving available job data. This step may entail, for example, the optimization engine 212 retrieving available job data from the jobs database 204 or being passed this data by another element of the system. Similarly, at 504 available resource data is received (e.g., at the optimization engine 212). At 506, a first optimization is performed to determine the maximum number of jobs that can be assigned at a first priority level. As described above, the first priority level may designate jobs of highest importance. Once the maximum number of jobs at the first priority level is determined, the process proceeds to 508 to determine if there are additional job priority levels. If there are, at 510 the optimization engine 212 iteratively performs an additional optimization for each additional priority class to determine the maximum number of jobs that can be assigned at each priority level. Each ensuing optimization is constrained by the maximum number of jobs that are assignable at higher priority levels. If there is only one priority level, or once the maximum number of jobs at each priority level has been determined, at 512 a final optimization is performed to generate job assignments 326 to workers. As described above, in various embodiments this final optimization generates assignments while substantially simultaneously or sequentially minimizing travel time and balancing workload among a set of workers. At 514, the optimization engine compiles the assignments into a workplan or schedule. The dispatch server at 516 then passes the work schedule to one or more user computing devices 208.

In the preceding specification, various embodiments have been described. It will, however, be evident that various modifications and changes may be made thereunto without departing from the broader scope of the invention as set forth in the claims that follow. The specification and drawings are accordingly to be regarded in an illustrative rather than restrictive sense.

That which is claimed:

1. A system comprising:
   at least one database configured to store job data and resource data, wherein said job data comprises data for a plurality of jobs including a priority level, skills required and a job location for each of said plurality of jobs, and wherein said resource data comprises data for a plurality of workers including skills and a resource location for each of said plurality of workers, a maximum number of locations that each worker of said plurality of workers can visit within a predefined period of time, and a number of available workers of said plurality of workers; and
   an optimization engine configured to:
      select jobs having a first priority level and determine a first maximum number of jobs that can be filled by said plurality of workers at said first priority level, wherein the first maximum number of jobs is determined based at least in part on minimizing:
      in which t is a set of available workers, j is a set of the plurality of jobs of the first priority level, and $x_{tj}$ is a decision variable that is assigned a value of 1 if job j is assigned to worker t and is 0 otherwise;
      optimize assignment of one or more of said plurality of workers to specific ones of said first priority jobs, said specific first priority jobs totaling said first maximum number of jobs, and
      concurrently with said optimized assignment, perform at least one of:
         minimizing total travel time between respective resource locations of said one or more workers and job locations associated with said specific first priority jobs; or
         ensuring that each of said one or more assigned workers is assigned approximately the same amount of work.

2. The system of claim 1, wherein:
   said optimization engine is further configured to:
      select jobs having a second priority level and determine a second maximum number of jobs that can be filled by said plurality of workers at said second priority level, wherein the second maximum number of jobs is determined based at least in part on minimizing:
      in which t is a set of available workers, j is a set of the plurality of jobs of the second priority level, and $x_{tj}$ is a decision variable that is assigned a value of 1 if job j is assigned to worker t and is 0 otherwise, while maintaining said first maximum number of jobs; and
      optimize assignment of one or more of said plurality of workers to specific ones of said second priority jobs, said specific second priority jobs totaling said second maximum number of jobs.

3. The system of claim 2, wherein:
   said optimization engine is further configured to:
      select jobs having a third priority level and determine a third maximum number of jobs that can be filled by said plurality of workers at said third priority level, wherein the third maximum number of jobs is determined based at least in part on minimizing:
      in which t is a set of available workers, j is a set of the plurality of jobs of the third priority level, and $x_{tj}$ is a decision variable that is assigned a value of 1 if job j is assigned to worker t and is 0 otherwise, while maintaining said first and second maximum number of jobs; and
      optimize assignment of one or more of said plurality of workers to specific ones of said third priority jobs, said specific third priority jobs totaling said third maximum number of jobs.

4. The system of claim 1, wherein:
   said resource data further comprises sets of workers, wherein each set defines a group of workers having substantially similar skills; and
   ensuring that each of said one or more assigned workers is assigned approximately the same amount of work comprises ensuring that each worker within a respective set of workers is assigned approximately the same amount of work as other workers within said set.

5. The system of claim 4, wherein said amount of work is measured in increments of time.

6. The system of claim 1, wherein said optimization engine is further configured to compile said assignments into a schedule and present said schedule to a user via a computing device.

7. The system of claim 1, wherein said optimization engine comprises:

a travel-time module in communication with said assignment module, said travel-time module being configured to:
determine job locations corresponding to said first priority jobs and resource locations for said plurality of workers; and
determine a travel time between each first priority job location and each resource location; and
wherein said optimization engine is configured to receive said travel time from said travel-time module in order to minimize said total travel time.

8. The system of claim 1, wherein:
if job j cannot be done by the worker t $x_{tj}=0$;
each job j can be done by at most one worker $\Sigma x_{tj} \leq 1$;

the worker can do job j only if they visits the location l of the job, $x_{tj} \leq v_{tl}$ wherein $v_{tl}$ is a decision variable that takes the value 1 if worker t visits location l, but is 0 otherwise;
the worker t visits a location l only if they travels to that location $\Sigma r_{tlm} = v_{tl}$ $\Sigma r_{tml} = v_{tl}$ wherein m is a set of all locations, $r_{tlm}$ is a decision variable that describes a route that the worker t takes and that takes the value 1 if the worker travels from origin location l to destination location m, but is 0 otherwise;
the worker t visits the location b she starts out of $v_{tb}=1$;
for every priority class i higher that k, n[i] number of jobs must be assigned $$\sum_j \sum_t x_{ij} = n[i]$$

wherein n[i] is the number of jobs of priority l that must be assigned; and
the worker t's total time for travel and jobs must be less than their available time $$\sum_j d_j(x_j) + \sum_{l,m} t_{ml}(r_{ml}) \leq w_t$$

wherein $d_j$ is the duration of job j, $t_{ml}$ is travel time between locations m and l and $w_t$ is worker t's available time to work.

9. A method comprised of:
providing access to job data comprising a priority level, skills required and a job location for each of a plurality of jobs;
providing access to resource data comprising skills, a resource location for each of a plurality of workers, a maximum number of locations that each worker of said plurality of workers can visit within a predefined period of time, and a number of available workers of said plurality of workers;
determining via an optimization engine a first maximum number of jobs of a first priority level that can be assigned to one or more of said plurality of workers, said determination being made by assigning a decision variable $x_{tj}$ a value of 1 when job j of the plurality of jobs of the first priority level is assigned to worker t of the available workers and a value of 0 otherwise for each of the plurality of jobs of the first priority level and available workers and minimizing a summation of $x_{tj}$ for each of jobs j and workers t; and
generating assignments via the optimization engine of said one or more workers to specific ones of said plurality of jobs, said specific jobs totaling said first maximum number of jobs, and said assignment generation being constrained to assign said one or more workers while minimizing total travel time between the resource locations of assigned workers and respective assigned job locations.

10. The method of claim 9, further comprising:
determining a second maximum number of jobs of a second priority level that can be assigned to one or more of said plurality of workers by assigning a decision variable $x_{tj}$ a value of 1 when job j of the plurality of jobs of the second priority level is assigned to worker t of the available workers and a value of 0 otherwise for each of the plurality of jobs of the second priority level and available workers and minimizing a summation of $x_{tj}$ for each of jobs j and workers t, wherein said first maximum number of jobs is maintained when determining said second maximum number of jobs; and
wherein said job assignments generated total said first maximum number of jobs and said second maximum number of jobs.

11. The method of claim 10, further comprising:
determining a third maximum number of jobs of a third priority level that can be assigned to one or more of said plurality of workers by assigning a decision variable $x_{tj}$ a value of 1 when job j of the plurality of jobs of the third priority level is assigned to worker t of the available workers and a value of 0 otherwise for each of the plurality of jobs of the third priority level and available workers and minimizing a summation of $x_{tj}$ for each of jobs j and workers t, wherein said first and second maximum number of jobs are maintained when determining said third maximum number of jobs; and
wherein said job assignments generated total said first maximum number of jobs, said second maximum number of jobs and said third maximum number of job.

12. The method of claim 10, wherein said second priority level designates jobs of less importance than jobs at said first priority level.

13. The method of claim 9, wherein:
providing access to said job data further comprises providing access to a respective average time required to perform each of said plurality of jobs;
providing access to said resource data comprises providing access to a respective time constraint for each of said plurality of workers; and
said determination of said first maximum number of jobs is based further on said average time required to perform said plurality of jobs and said time constraint of said plurality of workers.

14. The method of claim 9, wherein:
providing access to said resource data further comprises providing access to designated sets of workers, wherein each set defines a group of workers having substantially similar skills; and
said assignment generation is further constrained to assign said one or more workers to said first priority jobs while ensuring that each worker within a respective set of workers is assigned approximately the same amount of work as other workers within said respective set.

15. The method of claim 9, further comprising:
compiling said generated assignments into a schedule; and
presenting said schedule to a user.

16. The method of claim 9, further comprising:
providing access to a respective travel time between each job location of said plurality of jobs and each resource location of said plurality of workers; and
generating said assignments based in part on said stored travel times.

17. A computer program product comprising:
a non-transitory computer readable memory having computer readable code embodied therein, for execution by a computing device having at least a processor and a memory, said code comprising:
   a first executable code portion configured to provide access to job data comprising a priority level, skills required and a job location for each of a plurality of jobs;
   a second executable code portion configured to provide access to resource data comprising skills, a resource location for each of a plurality of workers, a maximum number of locations that each worker of said plurality of workers can visit within a predefined period of time, and a number of available workers of said plurality of workers;
   a third executable code portion configured to determine a first maximum number of jobs of a first priority level that can be assigned to one or more of said plurality of workers, said determination being made based at least in part on minimizing:
   in which t is a set of available workers, j is a set of the plurality of jobs of the first priority level, and $x_{tj}$ is a decision variable that is assigned a value of 1 if job j is assigned to worker t and is 0 otherwise;
   a fourth executable code portion configured to generate assignments of said one or more workers to specific ones of said plurality of jobs, said specific jobs totaling said first maximum number of jobs, and said assignment optimization being constrained to assign said one or more workers while minimizing total travel time between the resource locations of assigned workers and respective assigned job locations.

18. The computer program product of claim 17, the code further comprising:
   a fifth executable code portion configured to determine a second maximum number of jobs of a second priority level that can be assigned to one or more of said plurality of workers, wherein the second maximum number of jobs is determined based at least in part on minimizing:
   in which t is a set of available workers, j is a set of the plurality of jobs of the second priority level, and $x_{tj}$ is a decision variable that is assigned a value of 1 if job j is assigned to worker t and is 0 otherwise, wherein said first maximum number of is maintained when determining said second maximum number of jobs, and wherein the fifth executable code portion is executable prior to said fourth executable code portion; and
   wherein said specific jobs assigned by said fourth executable code portion total said first maximum number of jobs and said second maximum number of jobs.

19. The computer program product of claim 18, the code further comprising:
   a sixth executable code portion configured to determine a third maximum number of jobs of a third priority level that can be assigned to one or more of said plurality of workers, wherein the third maximum number of jobs is determined based at least in part on minimizing:
   in which t is a set of available workers, j is a set of the plurality of jobs of the third priority level, and $x_{tj}$ is a decision variable that is assigned a value of 1 if job j is assigned to worker t and is 0 otherwise, wherein said first and second maximum numbers of jobs are maintained when determining said third maximum number of jobs, and wherein said sixth executable code portion is also executable prior to said fourth executable code portion; and
   wherein said specific jobs assigned by said fourth executable code portion total said first maximum number of jobs, said second maximum number of jobs and said third maximum number of jobs.

20. The computer program product of claim 18, wherein said second priority level designates jobs of less importance than jobs of said first priority level.

21. The computer program product of claim 17, wherein:
said first executable code portion is further configured to provide access to a respective average time required to perform each of said plurality of jobs;
said second executable code portion is further configured to provide access to a respective time constraint for each of said one or more workers; and
said third executable code portion is further configured to determine said first maximum number of jobs further based on said average time required to perform said one or more jobs and said time constraint of said one or more workers.

22. The computer program product of claim 17, wherein:
said second executable code portion is further configured to provide access to designated sets of workers, wherein each set defines a group of workers having substantially similar skills; and
said fourth executable code portion is further constrained to assign said one or more workers to said first priority jobs while ensuring that each worker within a respective set of workers is assigned approximately the same amount of work as other workers within said respective set.

23. The computer program product of claim 17, the code further comprising:
a fifth executable code portion configured to compile said generated assignments into a schedule; and
a sixth executable code portion configured to present said schedule to a user via a computing device.

24. The computer program product of claim 17, the code further comprising:
a fifth executable code portion configured to provide access to a respective travel time between each job location of said plurality of jobs and each resource location of said plurality of workers; and
wherein said fourth executable code portion is configured to generate said assignments based in part on said stored travel times.

* * * * *